4 Sheets--Sheet 1.

T. A. EDISON.

Printing Telegraphs.

No. 5,519. Reissued August 5, 1873.

4 Sheets--Sheet 2.

T. A. EDISON.

Printing Telegraphs.

No. 5,519. Reissued August 5, 1873

Witnesses,

Geo. D. Walker

Chas. H. Smith

Thos. A. Edison.

per Lemuel W. Serrell atty

T. A. EDISON.

Printing Telegraphs.

No. 5,519. Reissued August 5, 1873.

Thos. A. Edison.
Samuel W. Serrell Atty.

Witness.
Geo. D. Walker.
Chas. H. Smith.

T. A. EDISON.

Printing Telegraphs.

No. 5,519. Reissued August 5, 1873.

Thos. A. Edison.
Lemuel W. Serrell atty.

Witnesses
Geo. D. Walker.
Chas. N. Smith

UNITED STATES PATENT OFFICE.

THOMAS A. EDISON, OF NEWARK, NEW JERSEY, ASSIGNOR, BY MESNE ASSIGNMENTS, TO THE GOLD AND STOCK TELEGRAPH COMPANY, OF NEW YORK CITY

IMPROVEMENT IN PRINTING-TELEGRAPHS.

Specification forming part of Letters Patent No. 91,527, dated June 22, 1869; reissue No. 4,166, dated October 25, 1870; reissue No. 5,519, dated August 5, 1873; application filed June 19, 1873.

*To all whom it may concern:*

Be it known that I, THOMAS A. EDISON, now of Newark, in the county of Essex and State of New Jersey, have invented an Improvement in Printing-Telegraphs, of which the following is a specification.

In this printing-telegraph instrument the type-wheel is set by a step-by-step movement derived from an electro-magnet, and the impression is given by another magnet, and these magnets are connected with the main line and with a shunt in such a manner that the type-wheel magnet will be short-circuited when the printing is effected, thereby giving increased energy to the printing-magnet without enlarging the battery power. Several instruments are placed in the same circuit, and only one wire is required for operating the same, and the record is made at the receiving-station or stations without an operator being required at the receiving instrument. By reversing the polarity of the current a polarized switch is operated, and this becomes a circuit-changer to direct the pulsations from the receiving-station.

Figure 1:
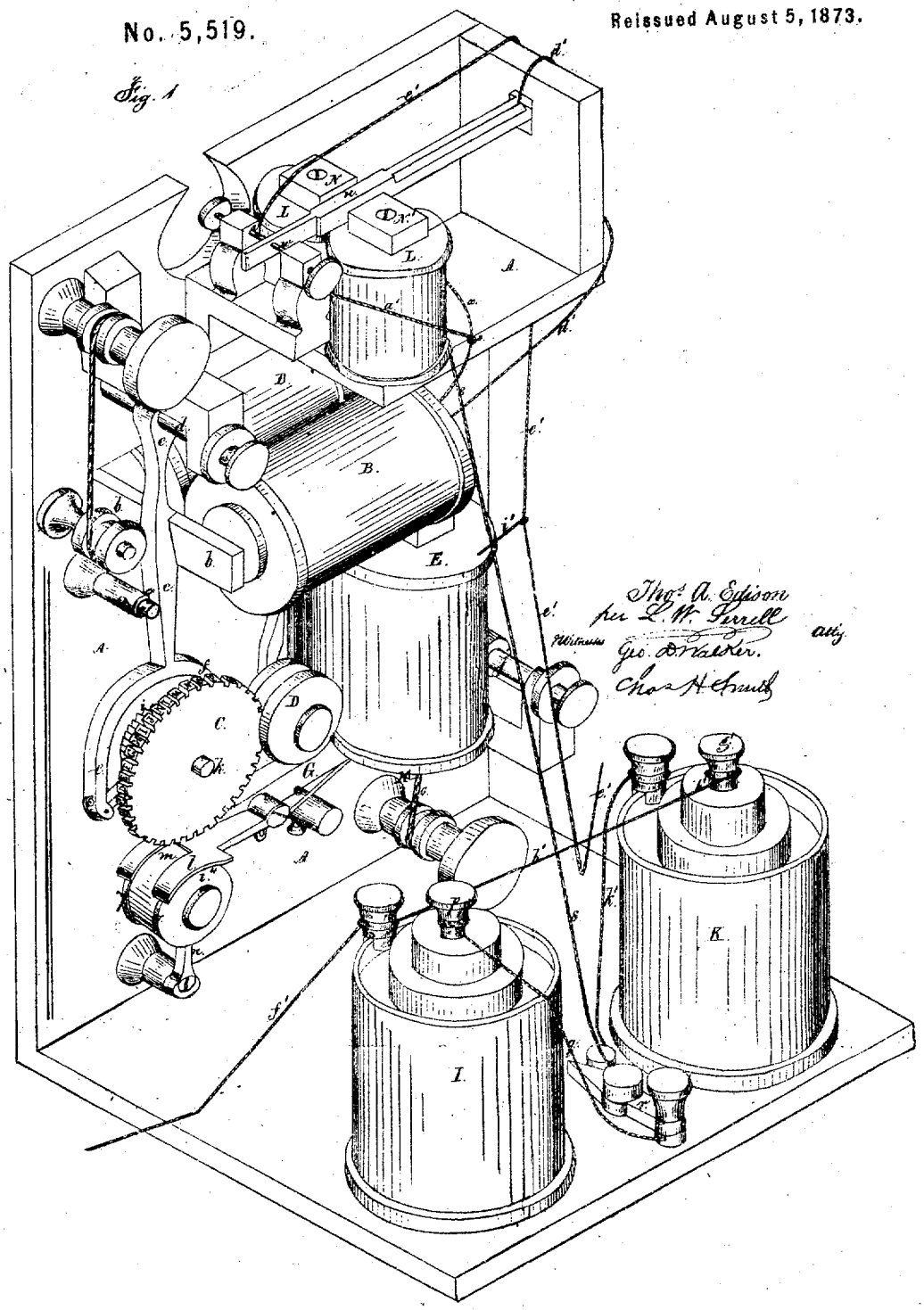
Figure 2:
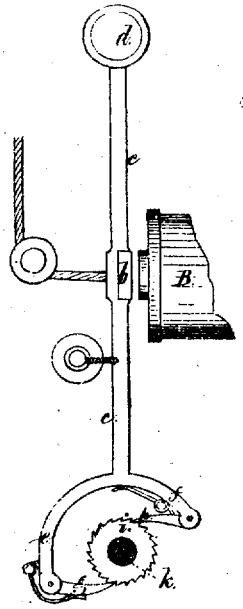
Figure 3:
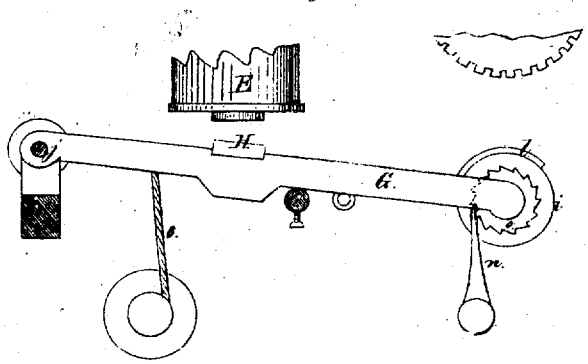
Figure 4:
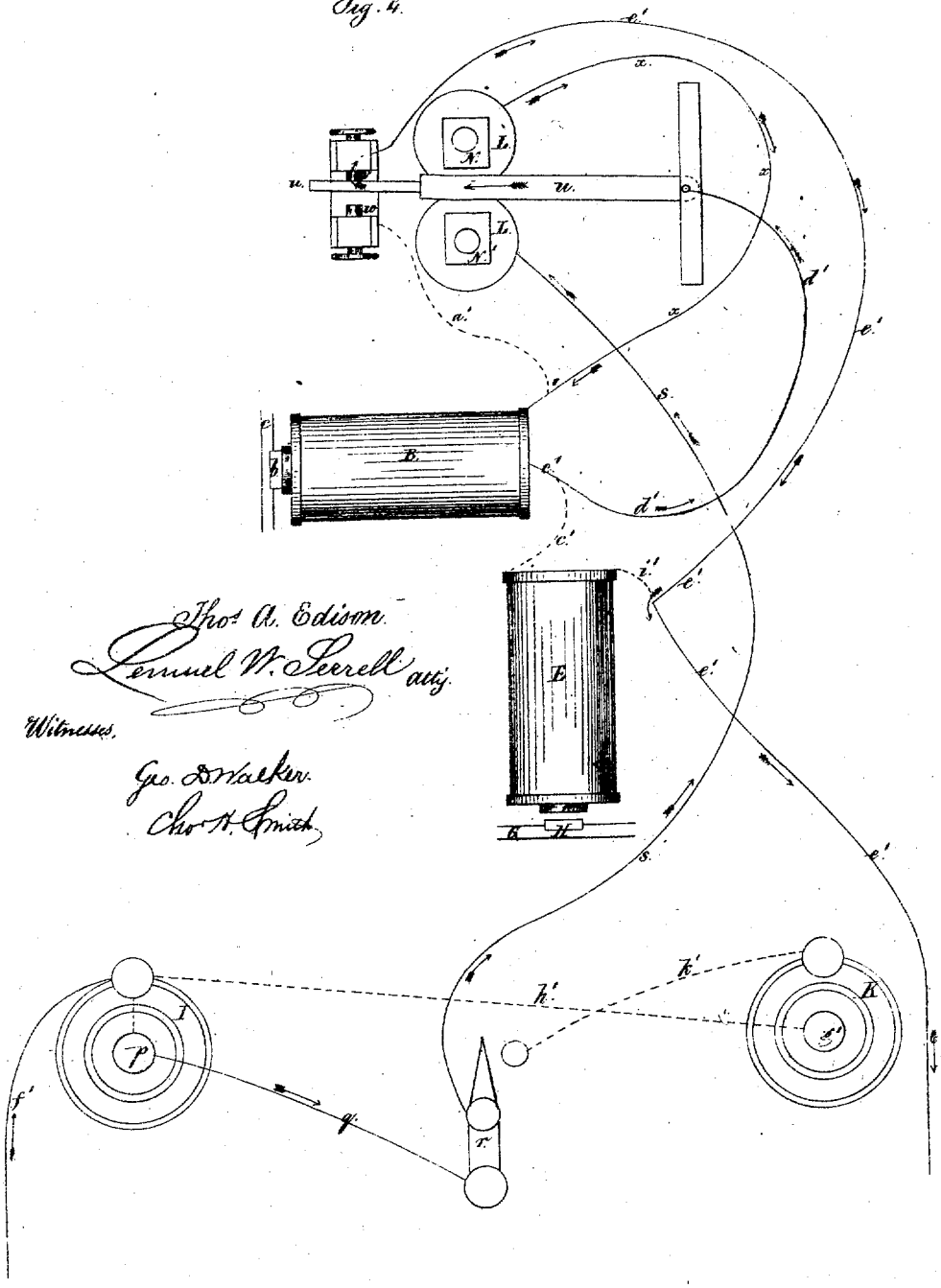
Figure 5:
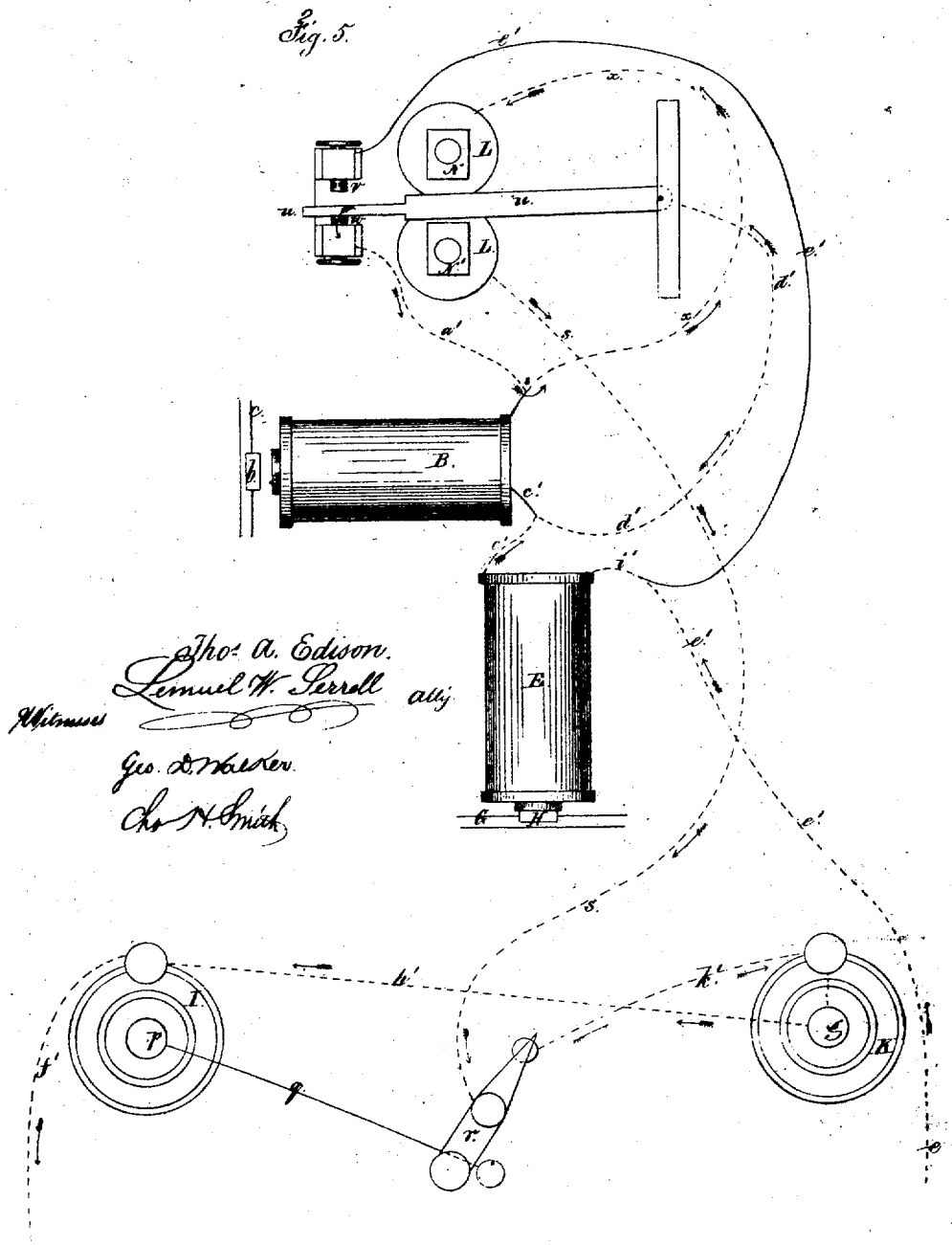

In the drawings, Figure 1 is a general perspective view. Fig. 2 represents the type-wheel magnet and mechanism for revolving the type-wheel. Fig. 3 shows the printing-lever, and Figs. 4 and 5 are diagrams illustrative of the circuit connections.

A represents the frame of the apparatus, to which is attached an electro-magnet, B B, of the usual construction. C is a type-wheel, whose periphery is provided with suitable letters or other characters, which revolves upon a stud or shaft, *k*. The armature *b* of the electro-magnet B is attached to a lever, *c*, suspended upon an arbor, *d*. The lower end of the lever *c* is bifurcated, as seen in Figs. 1 and 2, the two arms *e f* carrying pawls *g h*, which engage at opposite points upon the periphery of the ratchet-wheel *i*, which is fixed upon the same shaft as the type-wheel C, and revolves with it.

It will be understood, by reference to Fig. 2, that each vibration of the lever *c* backward or forward will cause the ratchet-wheel *i* to advance in its revolution the distance of one tooth in the same direction.

The type-wheel C receives its supply of ink from the roller D in any well-known manner.

The electro-magnet E is similar to the electro-magnet B, and is attached to the frame A. The armature H is attached to the lever G, and swings upon its axis at *j*. At its opposite extremity is a roller, *i'*, which occupies a position immediately beneath the type-wheel C.

The strip of paper upon which the communications are to be printed is led from a suitable reel, not shown, over the roller *i'*, upon which it is held with a sufficient degree of friction by a spring arm, *l*, provided with an open slot, *m*, so that when the roller *i'* is raised by the action of the electro-magnet E upon the lever G the strip of paper is brought in contact with whatever letter or character may at that time be opposite upon the type-wheel C, thereby printing the impression of said letter or character upon the paper. When the action of the electro-magnet E ceases the lever G is drawn back to its original position by a spring, 6.

After each impression has been made the strip of paper is moved forward by means of a pawl, *n*, which, when the lever G is drawn back, engages with the teeth of a ratchet-wheel, *o*, Fig. 3, which is secured to the roller *i'*, causing the said roller to revolve and draw the paper forward a sufficient distance to produce the required space between the letters.

The edges 7 of the roller *i'* are roughened to prevent the paper from slipping during the movement.

The electro-magnet L is in the main circuit, and the electro-magnets B and E are also in the main circuit, and the circuit-changer or switch *u* is operated by this magnet L, and the shunt-connections that act to direct or short-circuit the current are illustrated in Figs. 4 and 5.

The batteries I and K are of any usual character. A switch, *r*, is shown for connecting one battery or the other, and thereby reversing the circuit, as illustrated by the arrows in Figs. 4 and 5, $f'$ $h'$ representing the ground-wires or earth-connections, $s$ the line to the distant instrument, and $e'$ the line to the next instrument or to the earth.

By referring to Fig. 4 it will be understood that pulsations sent from the battery to the distant station by a finger-key or any competent circuit-breaker travel over the line-wires $s$, through the magnet L, wire $x$, and magnet B, to set the type-wheel; thence, by $d'$ $u$ $v$ $e'$ and earth-connection, to $f'$, $p$, and $q$ to $r$.

When the type-wheel is set the pole N′ attracts the switch $u$, and the printing-magnet is energized by a shunting operation, as seen in Fig. 5. The current passes through $e'$, $i'$, E, $c'$, $d'$, $u$, $w$, $a'$, $x$, L, and $s$; thereby the switch or circuit-changer $u$ connects the circuits, so that the type-wheel magnet B is shunted or short-circuited, for, although the magnet B still remains in the metallic circuit, the electric current will principally pass over the route of least resistance from $c'$ to $d'$, $u$, $a'$, and $x$, instead of going from $c'$ through B to $x$.

The shunt circuit-changer or a polarized relay, being well known, may be of any desired character, and my invention does not relate to the same.

Under all circumstances the electro-magnet L is the means for operating the circuit-changer or shunt-switch $u$; and when this is made as a polarized bar it will be changed from $w$ to $v$ according to the polarity of the current. I avail, therefore, of this means for moving the circuit-changer $u$, and employ pulsations of one polarity to set the type-wheel, and then a current of reverse polarity to effect the printing.

It will be evident that when the change of polarity is made use of the arrangement of the circuits shown in Fig. 4 causes the shunt-switch $u$ to short-circuit the printing-magnet E while the type-wheel is being set by pulsations acting in the magnet B, the magnet E remaining in the metallic circuit; but the principal portion of the current, taking the route of least resistance by $d'$, $u$, $v$, and $e'$, instead of going from $d'$ by $c'$, E, and $i'$ to $e'$; and when the change of polarity in the current is employed to effect the movement in the shunt-switch $u$ the type-wheel magnet B is short-circuited or shunted as before.

The switch $u$ is so made that it will move more rapidly than either of the armatures of the magnets E B. Hence one or the other of the magnets will be shunted by the movement of the switch, and there will not be any false movement of either armature.

The above-described invention is designed particularly for transmitting intelligence from a central station to a number of receiving-stations included in the circuit, in which case no batteries or operators will be required at the receiving-stations; but if messages are to be sent from each station as well as received, then each instrument will require to be provided with a transmitting instrument, a battery, and an ordinary switch connected with a ground-wire.

What is claimed as the invention of said T. A. EDISON is—

1. A printing-telegraph instrument with the printing and type-wheel magnets in the metallic circuit forming part of the main line, and a shunt-switch operated by electro-magnetism to divert the current from the type-wheel magnet while the printing is effected, substantially as set forth.

2. A separate magnet in the main line to cut out, by a switch and shunt connection, either the printing or the type-wheel magnets, substantially as set forth.

3. In a printing-telegraph instrument, three electro-magnets within the metallic circuit forming part of the main line, and a shunt-switch operated by magnetism, whereby the current is diverted or short-circuited from one magnet by the movement of the switch, substantially as set forth.

4. Two or more printing-telegraph instruments placed in one main circuit, and operated simultaneously by pulsations of electricity, the type-wheel being set by pulsations of one polarity, and the printing being effected by pulsations of the opposite polarity, substantially as set forth.

5. Two or more printing-telegraph instruments placed in one main circuit, with all the electro-magnets in metallic connection with that circuit, so that the entire circuits remain unbroken, in combination with shunts and switches actuated by magnetism to direct the current principally through the printing-magnets when the impression is to be made, substantially as set forth.

MARSHALL LEFFERTS,
*President the Gold and Stock Telegraph Co.*
NORMAN C. MILLER,
*Secretary.*

Witnesses:
GEO. T. PINCKNEY,
CHAS. H. SMITH.